May 13, 1941.　　　　I. E. COFFEY　　　　2,241,766
WINDSHIELD WIPER MECHANISM
Filed April 4, 1939　　　3 Sheets-Sheet 1
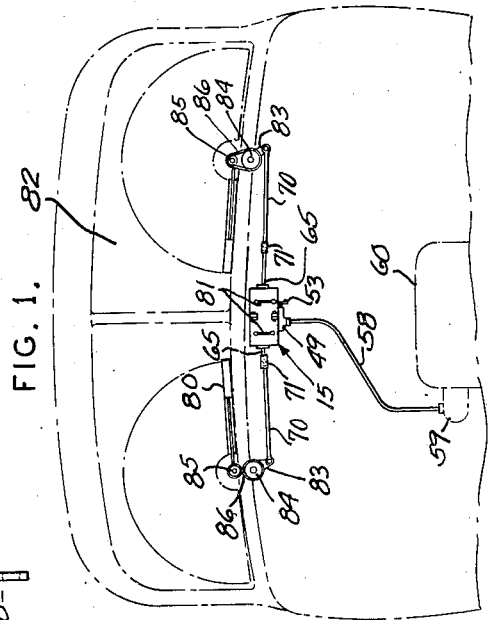
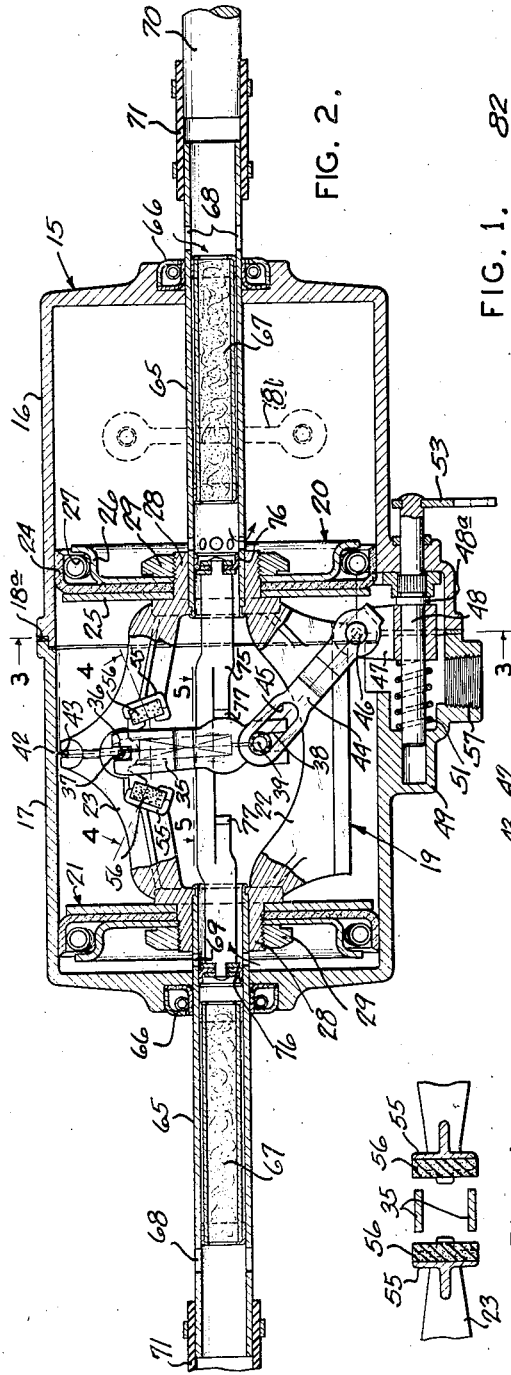
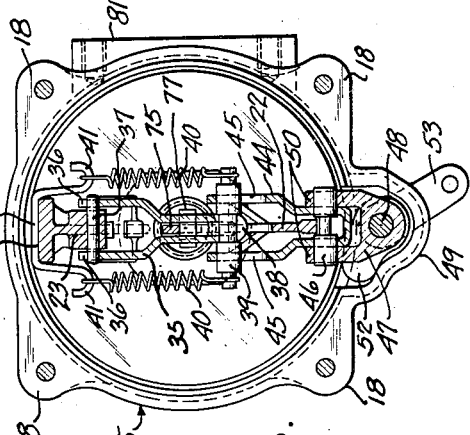
INVENTOR
IRVEN E. COFFEY
BY Donald U. Rich
ATTORNEY May 13, 1941.  I. E. COFFEY  2,241,766
WINDSHIELD WIPER MECHANISM
Filed April 4, 1939  3 Sheets-Sheet 2

INVENTOR
IRVEN E. COFFEY
BY Donald U. Rich
ATTORNEY

Patented May 13, 1941

2,241,766

UNITED STATES PATENT OFFICE 2,241,766

WINDSHIELD WIPER MECHANISM

Irven E. Coffey, Normandy, Mo., assignor to Carter Carburetor Corporation, St. Louis, Mo., a corporation of Delaware Application April 4, 1939, Serial No. 265,883

17 Claims. (Cl. 121—123)

This invention relates to fluid motors particularly of the type arranged to utilize intake manifold depression for operating automotive windshield wipers.

It is an object of the invention to provide a windshield wiper motor of sufficient capacity to maintain proper movement of the wiper blade under substantially all load conditions and irrespective of variations in the manifold depression during operation of the engine. Another object of the invention is to provide a windshield wiper motor of rugged, relatively simple construction and arranged to function relatively noiselessly. Another object is to provide novel valve and piston mechanism for utilizing the manifold depression to provide a reciprocating motion for operating the wipers. Still another object is to provide novel "parking" mechanism to insure positioning of the wipers out of the range of the driver's vision whenever the motor is stopped. These objects and other more detailed objects hereafter appearing are attained substantially by the device illustrated in the accompanying drawings in which:

Fig. 1 is a diagrammatic front view illustrating part of an automobile body with a pair of windshield wipers and a motor of the present type applied thereto.

Fig. 2 is a cross sectional view of the novel motor showing the valve operating mechanism at the point of shifting.

Fig. 3 is a vertical cross sectional view taken substantially on the line 3—3 of Fig. 2.

Figs. 4 and 5 are detailed sections taken substantially on the corresponding section lines of Fig. 2.

Figure 6:
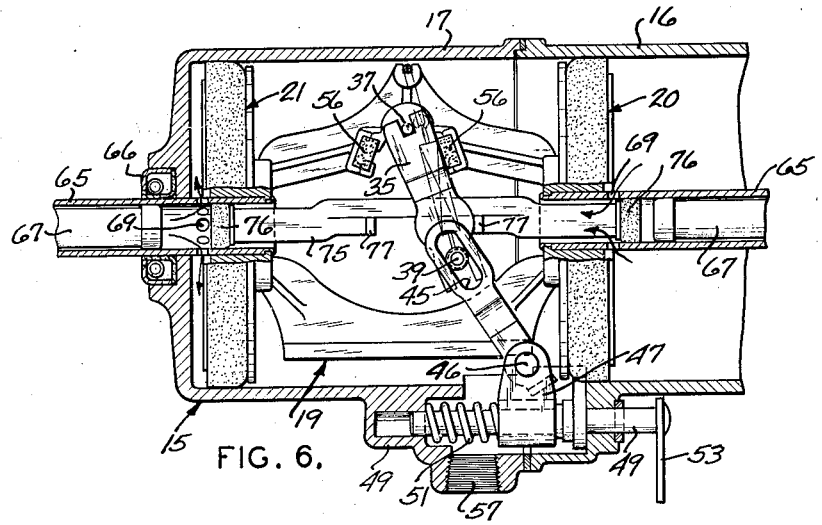
Fig. 6 is a partial sectional view corresponding to Fig. 2 but showing the valve operating mechanism.

The windshield wiper motor comprises a cylindrical casing generally indicated at 15 and formed of two parts 16 and 17 (Fig. 2) secured together at the center by suitable bolting flanges 18, and with the interposition of a sealing gasket 18a. Within the casing is a piston structure, generally indicated at 19, formed of a pair of pistons 20 and 21 rigidly connected by yokes 22 and 23. Piston 20, which is identical with piston 21, is formed of a leather cup 24 secured between a large washer 25 and a dome-like, metallic part 26. An annular coiled spring 27 is inserted between the leather cup and the dome-like part for urging the sealing cup against the casing wall. Yokes 22 and 23 merge at their ends in threaded bosses 28 which are inserted through registered openings in the piston elements 24, 25 and 26 and secured thereto by nuts 29 to maintain the piston assemblies.

Pivotally mounted on the upper yoke 27 is a bifurcated toggle link 35, best shown in Fig. 3, each leg of which is recessed at the upper end, as at 36, to receive a pin 37 rigidly mounted in yoke 23. The lower extremity of toggle link 35 is also recessed at 38 and receives a transverse pin 39. Coiled springs 40 are secured under tension between the projecting ends of pin 39 and the hooked ends 41 of a wire loop 42 seated in a transverse recess 43 formed in the upper edge of yoke 23 at the center. A second bifurcated link 44 has the upper extremities of its legs longitudinally slotted, as at 45, to receive pin 39 and is pivotally mounted at its lower extremity upon a pin 46.

A member 47 is mounted on a rod 48 slidable longitudinally in suitable openings provided therefor in the opposite walls of an enlargement 49 formed on the lower portion of the casing. Member 47 has upwardly projecting bifurcations 50 outside link 44 and mounting pin 46. Member 47 is constantly maintained in engagement with a collar 48a on rod 48 and the rod and member 47 are urged to the right (Fig. 2) by a coiled spring 51 compressed between the inner face of casing enlargement 49 and the adjacent face of member 47. Projecting laterally from rod 48 inside the casing is a finger 52 disposed to be moved in the path of pistons 20 and 21, for a purpose to be described hereafter, and a small manipulating handle 53 outside the casing and preferably positioned to be conveniently grasped by the driver of the vehicle.

Projecting from yoke 23 on each side of toggle link 35 (Fig. 4) are brackets 55 each receiving a rubber bumper 56 for limiting the swiveling of lever 35 about pivot pin 37. Depending from casing enlargement 49 is a threaded boss 57 for attachment of line 58 (Fig. 1) connected to the intake manifold 59 on engine 60 so as to transmit the pressure conditions existing in the intake manifold to the chamber or space inside the piston structure between the pistons 20 and 21.

A tubular stem 65 extends longitudinally from each piston through suitable packing gland 66 in the casing end wall. Received within the interior of each stem is a wad of suitable fibrous, shredded, or porous material 67, steel wool being suggested, for cleaning the air drawn through the stem and also functioning as silencing means. Each stem has a pair of openings 68 outwardly of wadding 67 and constantly in communication with the atmosphere outside the motor casing and a second group of annularly disposed openings 69 inwardly of the wadding for connecting the interior of the stem to the corresponding pressure chamber inside the casing. Each stem is connected to a wiper blade (80, 81) by a force transmitting extension 70 and a tubular coupling 71, preferably of rubber or other pliable material.

A rod 75 extends longitudinally of the piston structure between the bifurcations of toggle link 35 (see Fig. 3), and into the adjacent ends of hollow stems 65. Mounted in each end of rod 75 is a piston valve element 76, the rod being of such length as to leave the openings 69 in one stem 65 exposed to atmosphere through the stem, at the same time the openings 69 in the opposite stem are cut off from atmosphere. Rod 75 has spaced, laterally off-set lips 77 (Fig. 5) positioned to be engaged by toggle link 35 near the extremity of the piston movement to shift valves 76.

Fig. 1 shows motor casing 15 mounted on the cowl portion of an automobile body by means of brackets 81 and operatively connected to a pair of wiper blades 80 pivotally mounted at the lower edge of windshield 82.

The motor is connected to blades 80 by means of extension rods 70 each pinned at its outer end to a lever 83 rigid with a pulley 84. A second pulley 85 is mounted above each pulley 84 and slightly above the lower edge of the windshield. Wipers 80 are carried by pulleys 85. Each pair of pulleys 84 and 85 is connected by a belt 86, the left hand belt being crossed so that the wiper blades will operate oppositely. These mountings are such that the blades 80 move substantially to the lower edge of the windshield at each stroke.

The operation of the novel motor is as follows: The piston structure defines expansible pressure chambers at opposite ends of the casing which are alternately exposed to atmosphere and intake manifold depression by means of the valve mechanism located in the cavity in the piston structure.

Fig. 2 shows the piston structure substantially at the left hand end of its stroke and just prior to tripping of the valve mechanism with the right hand pressure chamber exposed to atmosphere and the left hand chamber exposed to suction. Pin 39 is at the upper end of slot 45. Fig. 6 shows the piston structure moved slightly farther to the left than in Fig. 2 and with link swung counterclockwise so as to pass over the dead center position and trip the over-center mechanism causing shifting of valve members 76 to the right by engagement of link 35 with the right hand lug 77 on rod 75. This reverses the pressure conditions in the pressure chambers causing a rush of air into the left hand chamber and evacuation of the right hand chamber through the piston structure and suction connection 58, as to force the piston structure to the right.

Figure 7:
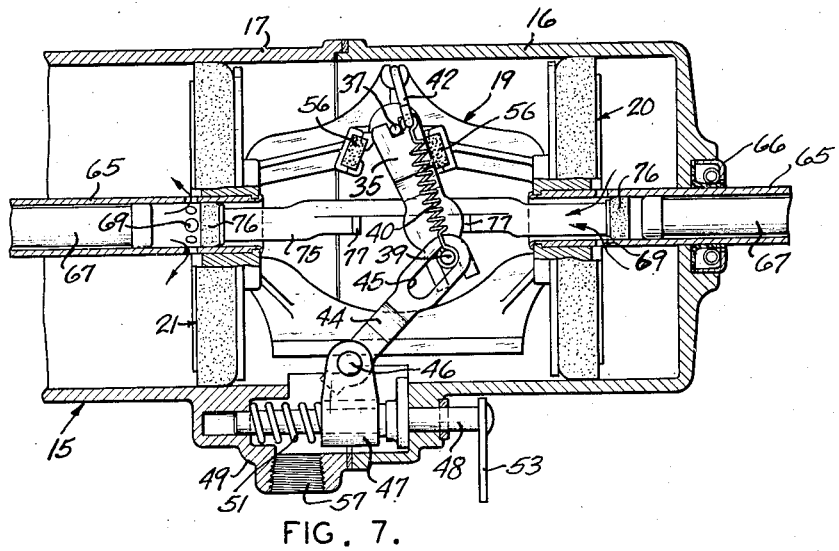
Fig. 7 is a view similar to Fig. 6 but showing the piston structure in an intermediate position.
Figure 8:
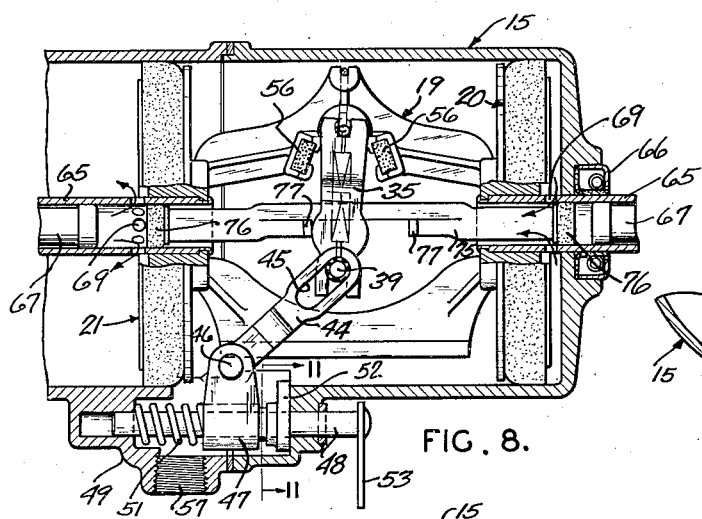
Fig. 8 shows the piston structure substantially at the opposite end of its stroke from the position shown in Fig. 2.
Figure 11:
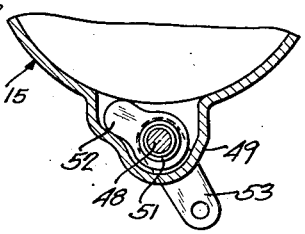
Figs. 11 and 12 are detailed cross sectional views taken substantially on the corresponding section lines of Figs. 8 and 9, respectively.
Figure 9:
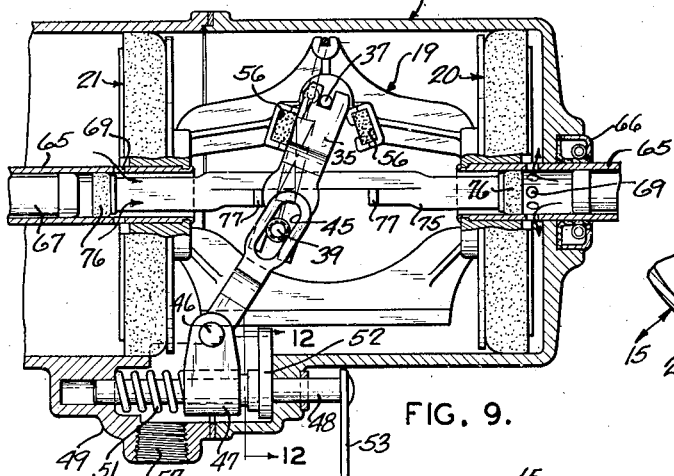
Fig. 9 shows the piston structure and valve operating mechanism substantially as in Fig. 6, but with the piston structure at the opposite end of its stroke and the "parking" device operative to stop the motor.

Fig. 7 shows the piston structure approaching the right hand extremity of its stroke with pin 39 just at the upper edge of slot 45 in lower link 44. In Fig. 8 the piston structure is substantially at the right hand extremity of its stroke and with the over-center mechanism substantially at the dead center position. In Fig. 9 link 35 has tripped in the clockwise direction, striking left hand lug 77 so as to again reverse valve members 76. As shown in Figs. 6 and 9, link 35 is limited in its movements by engagement with rubber bumpers 56. Lower link 44 functions as a self tripping stop for the over-center mechanism.

Figure 12:
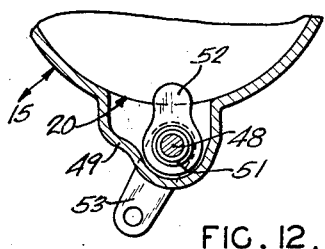
Figure 10:
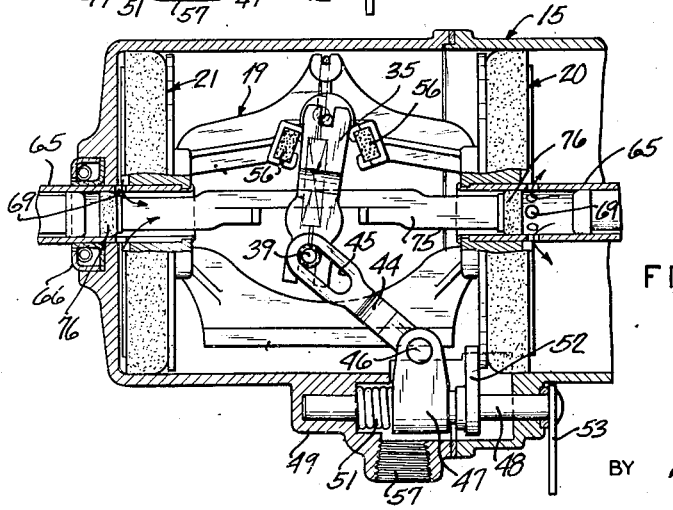
Fig. 10 shows the motor parts in their "parked" positions.

In each of Figs. 2, 3, 6, 7, 8 and 11, finger 52 on rod 48 is lowered so as to clear piston 20 in its reciprocations within the casing. Figs. 9, 10 and 12 show this finger rotated clockwise, as may be done by means of handle 53, and into the path of piston 20. In Fig. 10, this piston has engaged finger 52 and forced the same together with rod 48, member 47, and stop link 44 to the left, compressing spring 51. This, in turn, has the effect of preventing tripping of link 35 when the piston structure reaches the left hand end of its stroke. Accordingly, valves 76 are not shifted and the movement of the piston structure is stopped. In order to re-start the motor, it is merely necessary to rotate handle 53 and finger 52 counterclockwise so as to clear piston 20, whereupon spring 51 will force member 47, rod 48, and link 44 to the right so as to swing link 35 counterclockwise past dead center and trip the valve operating toggle, as in Fig. 6. Thus, atmosphere is admitted immediately into the collapsed pressure chamber at the left of the piston structure and is exhausted from the expanded chamber to the right (Fig. 10) resulting in re-initiated movement of the piston structure.

It is obvious that the motor can be stopped only at a definite extreme position and that, accordingly, the wiper blades will always stop out of the range of vision of the driver. Furthermore, the piston structure and wiper blades will be firmly held in their "parked" position due to the fact that suction from the intake manifold will be applied constantly to the collapsed pressure chamber as long as the engine is operating and "parking" elements 52, 48, and 47 are urged to the left against spring 51 due to engagement of finger tip 52 by piston 20. Finger 52 does not interfere with the left hand piston 21, so that the piston structure will always stop at the left hand extremity of its stroke regardless of the point in its movement when the parking handle 53 is operated.

The "parked" position of the motor corresponds with one end of the stroke thereof during normal operation so that the wiper blades may normally operate from edge to edge of the windshield, no extra space being necessary, as is sometimes the case, to permit movement of the blades to their "parked" positions.

Pistons 20 and 21 constitute the movable walls of expansible and collapsible pressure chambers and, as such, bellows may be substituted therefor.

The device has substantial features of advantage and novelty as described and others which will be readily apparent to those skilled in the art. The exclusive use of all modifications as come within the scope of the claims is contemplated.

I claim.

1. In a fluid pressure operated motor, a casing, wall structure therein having a cavity, said casing and structure being relatively movable, tubular members projecting oppositely from said wall structure through said casing and communicating with said cavity and with the interior of said casing on opposite sides of said structure, means for connecting said cavity and said tubular members with sources of differential fluid pressures, valves in said tubular members, and means for automatically operating said valves to alternately connect the opposite portions of said casing structure to said fluid pressure sources.

2. In a fluid pressure motor, a casing, wall structure movable therein and defining an expansible pressure chamber, a hollow force transmitting rod projecting from said structure and forming a fluid passage, there being an opening in said rod for connecting the passage therein with said chamber, means for connecting said passage on opposite sides of said opening with sources of different fluid pressures, a valve in said passage and associated with said opening, and over-center mechanism including a link pivotally attached to said wall structure and a second link pivotally attached at one end to said first mentioned link and at the other end to said casing structure, said mechanism being moved to a disaligned position as said piston structure approaches the end of its stroke, spring means for urging said over-center mechanism to a different disaligned position as said structure approaches the end of its stroke, and means connecting said over-center mechanism with said valve for alternately exposing said opening and said chamber to said pressure sources.

3. A device as specified in claim 2 in which said second-mentioned toggle link is provided with a pivotal support on said casing which is movable relative to said piston structure to a position in which said over-center mechanism will be prevented from passing over its dead center position at the end of the stroke of said piston structure, and means for selectively moving said pivotal support to the non-tripping position.

4. A device as specified in claim 2 in which said second-mentioned over-center mechanism link is provided with a pivotal support on said casing which is movable longitudinally thereof to a non-tripping position in which said mechanism is prevented from passing over dead center as said wall structure reaches the end of its stroke, and an element on said pivotal support and selectively movable to a position in the path of said wall structure near one end of its stroke whereby said structure will move said pivotal support to its non-tripping position.

5. In a fluid pressure motor, a casing, piston structure therein, a fluid passage communicating with the interior of said casing, a valve operably associated with said passage, over-center mechanism for operating said valve including a member pivotally carried by said piston structure and a second member pivotally attached to said first mentioned member at a point spaced from the pivotal support thereof on said piston structure, means on said casing for stopping the movement of the end of said second-mentioned member spaced from said first mentioned member as said piston structure approaches the end of its stroke to cause said over-center members to become disaligned, spring means for enforcing rapid movement of said over-center mechanism when so disaligned, and means for moving said stop means to a non-tripping position in which said over-center mechanism will be prevented from becoming disaligned when said piston structure approaches the end of its stroke to prevent tripping of said mechanism and consequent readjustment of said valve.

6. A device as specified in claim 5 in which said stop means includes an element manually movable to a position in the path of said piston structure near the end of its stroke whereby the further movement of said piston moves said stop member to the non-tripping position.

7. In a fluid pressure motor, a casing, piston structure therein having a cavity and forming expansible pressure chambers in said casing, force transmitting tubes projecting oppositely from said structure and each having an opening outside said casing, an opening inside said casing into one of said pressure chambers, and an opening into said cavity, means to expose said cavity and said outside opening to differential pressures, a valve associated with each of said inside openings and adapted to alternately expose the same and the adjacent pressure chambers to the pressures in said cavity and at said outside openings, and automatic reversing mechanism for said valves in said cavity.

8. In a fluid pressure motor, a casing, movable piston structure having a cavity and forming pressure chambers in said casing, piston rods projecting oppositely from said piston structure through said casing, fluid passages extending longitudinally through said rods, there being an opening in each of said rods for connecting the passage therein with one of said pressure chambers, means for connecting each of said passages on one side of the opening therein to a source of fluid pressure, said passages on the other sides of said openings communicating with the cavity in said piston structure, means for connecting said cavity to a source of different fluid pressure, and over-center mechanism in said cavity including a link pivoted at one end to said piston structure and a second link pivoted at one end to the opposite end of said first-mentioned link and at its other end to said casing, valves associated with said openings in said piston rod passages, and means connecting said valves to the intermediate portion of said over-center mechanism, said over-center mechanism being arranged to trip as said piston structure approaches the end of its stroke so as to alter the positions of said valves and alternately expose the opposite ends of said casing to said different fluid pressure sources.

9. In a fluid pressure motor, a casing, piston structure therein forming a pressure chamber with said casing, a force transmitting piston rod extending from said structure through said casing, means including a fluid passage extending longitudinally through said rod and a valve in said passage for alternately exposing said chamber to sources of different fluid pressures, a member pivotally mounted on said piston structure, a spring connecting a portion of said piston structure and a part of said member spaced from the pivotal mounting thereof, means for operating said valve from said member, and stop means on said casing for engaging said pivotal member as said piston structure approaches the end of its stroke to enforce a predetermined positioning of said spring and cause the same to reverse the position of said valve.

10. A device as specified in claim 9 further including mechanism for selectively moving said stop means away from its tripping position to prevent reversing of said valve at the end of the piston stroke so as to stop the motor.

11. A device as specified in claim 9 in which said stop means is movable to a non-tripping position and includes an element manually movable to a position in the path of said piston structure near the end of its stroke whereby said piston structure moves said stop means to the non-tripping position.

12. In a fluid motor, a casing, movable wall structure defining pressure chambers therein, fluid duct means opening into said chambers for connecting the same to fluid pressure sources, valve means in said duct means for controlling the communication between said duct means and said chambers, means to effect automatic shifting of said valve means, and a device manually movable to a position to be operated by said wall structure during movement thereof to prevent shifting of said valve means.

13. In a fluid motor for windshield wipers, a casing and wall structure forming a collapsible and expansible pressure chamber therewith, means for alternately connecting said chamber to sources of differential fluid pressures, and a parking device manually movable to a position to be operated by a normally movable part of the motor to stop the motor.

14. In a fluid pressure operated motor, a casing having a movable wall forming an expansible and contractible pressure chamber, duct means to connect said chamber to sources of differential fluid pressures, automatically actuated reversing valve mechanism controlling said duct means, and a parking device manually movable to a position to be operated by a normally movable part of the motor to prevent reversing of said valve mechanism.

15. A fluid motor as specified in claim 7 in which said valve reversing mechanism comprises a snap-action over-center device carried by said piston structure and a stop element on said casing for tripping said mechanism.

16. In a fluid pressure operated motor, a casing, wall structure therein comprising spaced pistons, said casing and structure being relatively movable and said casing forming pressure chambers on opposite sides of said structure, tubular members projecting oppositely from said wall structures and each communicating with the space between said pistons and having an outside opening and an inside opening to one of said chambers, means for connecting said casing between said pistons and said outside openings to sources of differential fluid pressures, valve means in said tubular members, and mechanism for automatically shifting said valve means for alternately exposing said inside openings and said chambers to the pressures in said cavity and at said outside openings.

17. In a fluid pressure operated motor, a stationary casing, hollow wall structure movable in said casing and forming pressure chambers at opposite ends thereof, force transmitting tubes projecting oppositely from said wall structure through said casing and each communicating with the interior of said wall structure and having an outer opening communicating with atmosphere outside the casing and an inner opening communicating with one of said chambers means for connecting the interior of said wall structure with a source of pressure different from atmospheric, valves in said tubes and associated with said inside openings so that one of said pressure chambers is normally connected with atmosphere when the other chamber is connected with the interior of said wall structure, and means operable as said piston approaches each end of its stroke to shift said valves so as to reverse the pressure conditions in said pressure chambers.

IRVEN E. COFFEY.